(12) United States Patent
Park et al.

(10) Patent No.: US 11,577,383 B2
(45) Date of Patent: Feb. 14, 2023

(54) PARTS ASSEMBLING SYSTEM AND METHOD

(71) Applicants: HYUNDAI MOTOR COMPANY, Seoul (KR); KIA MOTORS CORPORATION, Seoul (KR)

(72) Inventors: Jongmin Park, Daegu (KR); Jeong Seong An, Ulsan (KR); Junhyeok Bae, Ulsan (KR); Young Seok Lee, Ulsan (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 376 days.

(21) Appl. No.: 16/846,327

(22) Filed: Apr. 11, 2020

(65) Prior Publication Data

US 2021/0094170 A1 Apr. 1, 2021

(30) Foreign Application Priority Data

Sep. 26, 2019 (KR) .................. 10-2019-0118695

(51) Int. Cl.
*B25J 15/06* (2006.01)
*B25J 9/00* (2006.01)
*B23P 19/00* (2006.01)

(52) U.S. Cl.
CPC .......... *B25J 9/0093* (2013.01); *B23P 19/002* (2013.01); *B25J 15/0608* (2013.01)

(58) Field of Classification Search
CPC ..... B23P 19/002; B25J 9/0093; B25J 15/0608
See application file for complete search history.

(56) References Cited

U.S. PATENT DOCUMENTS

2021/0187783 A1* 6/2021 Bellissimo ........... B27M 3/0013

* cited by examiner

*Primary Examiner* — Saul Rodriguez
*Assistant Examiner* — Brendan P Tighe
(74) *Attorney, Agent, or Firm* — McDonnell Boehnen Hulbert & Berghoff LLP

(57) ABSTRACT

A part assembly system is disclosed that includes a first conveyor configured to convey fastening target parts and a second conveyor configured to convey correlated parts to which the fastening target part is to be fastened, including: i) a bolt supplying unit configured in a robot working section between the first and second conveyors and supplying bolts to a predetermined position; and ii) a robot gripper configured in the robot working section, picking up the bolts to distribute the bolts to a fastening position of the fastening target part, and moving the fastening target part to a manual working section of the second conveyor.

10 Claims, 15 Drawing Sheets

PARTS ASSEMBLING SYSTEM AND METHOD

CROSS-REFERENCE TO RELATED APPLICATION

This application claims priority to and the benefit of Korean Patent Application No. 10-2019-0118695 filed in the Korean Intellectual Property Office on Sep. 26, 2019, the entire contents of which are incorporated herein by reference.

BACKGROUND

(a) Field

An embodiment of the present disclosure relates to a part assembling system, and more particularly, to a part assembling system for assembling a head cover to a cylinder block in an engine assembling line, and a part assembling method using the same.

(b) Description of the Related Art

Generally, a fastening member including a bolt and a nut is representative of a mechanical joining element for joining two or more parts. The fastening member is used in various mechanical industrial fields, including a vehicle manufacturing field.

In a process of assembling parts of an engine, a transmission, and a suspension in a vehicle production process, a fastening target part is fastened to a correlated part by using a fastening member such as a bolt and a nut.

For example, in an engine assembling line, a head cover as a fastening target part is fastened to a cylinder block as a correlated part through a bolt.

In such a process, a head cover suitable for an engine model for each vehicle model is mounted on a cylinder block, the cylinder block and the head cover are temporarily fastened by a bolt suitable for the model, and then the cylinder block and the head cover are fastened by a bolt fastener.

However, currently, since such a series of fastening processes are performed by a worker's manual work, a fault in assembly of an engine may be caused by an operators mistake in selecting a head cover and a bolt suitable for a model.

Therefore, in the prior art, there is a problem of lowering assembly production and assembly quality due to faulty assembly of the engine, and a foolproof process (a process for preventing a worker's error) is required.

The above information disclosed in this Background section is only for enhancement of understanding of the background of the disclosure, and therefore it may contain information that does not form the prior art that is already known in this country to a person of ordinary skill in the art.

SUMMARY

Embodiments of the present disclosure provide a part assembly system that may shorten a cycle time to assemble parts by cooperative work of a worker and a robot, and a part assembling method using the same.

An embodiment of the present disclosure provides a part assembly system that includes a first conveyor configured to convey fastening target parts and a second conveyor configured to convey correlated parts to which the fastening target part is to be fastened, including: i) a bolt supplying unit configured in a robot working section between the first and second conveyors and supplying bolts to a predetermined position; and ii) a robot gripper configured in the robot working section, picking up the bolts to distribute the bolts to a fastening position of the fastening target part, and moving the fastening target part to a manual working section of the second conveyor.

In the manual working section, the fastening target part moved to the predetermined position by the robot gripper may be temporarily fastened to the correlated part by the bolts.

An embodiment of the present disclosure provides a part assembly system including: i) a first conveyor configured to convey fastening target parts of different models along a set path; ii) a second conveyor configured to convey correlated parts of different models to which the fastening target parts are fastened through bolts along a set path; iii) a plurality of part feeders provided in a robot working section between the first and second conveyors and supplying bolts corresponding to a model of a fastening target part and a correlated part to be fastened to each other along respective predetermined paths; iv) a bolt aligning portion connected to the part feeder and aligning bolts supplied through the part feeder at a predetermined position; v) a handling robot having a rotating body rotatably provided at a front end of a multi-joint arm and installed in the robot working section; vi) a first gripper installed at the rotating body and configured to grip bolts aligned at the bolt aligning portion to distribute the bolts to a fastening portion of a fastening target part on the first conveyor; and vii) a second gripper installed on a mounting bracket fixed to a front end portion of an arm of the handling robot and gripping a fastening target part on the first conveyor to which the bolts are distributed.

The part assembly system may further include a push rod installed in the mounting bracket to be movable upward or downward through a push cylinder, and selectively pushing the bolts gripped by the first gripper.

The part assembly system may further include a mounting jig installed in a manual working section of the second conveyor to allow the fastening target parts gripped by the second gripper to be mounted by the handling robot.

The bolt aligning portion may include a line feeder connected to the part feeder and aligning the bolts so that the head portions thereof face upward, and conveying the bolts in a straight line direction, and a bolt index connected to the line feeder and aligning the bolts to be conveyed at a set interval along a circular track.

The line feeder may include a rail block supporting a thread portion of the bolt, and a supporting block supporting a head portion of the bolt.

The bolt index may include a ring-shaped fixing member connected to the line feeder, and a circular block-shaped rotating member disposed at a predetermined interval with an inner circumferential side of the fixing member and being rotatable by a servo motor.

A space in which the thread portion of the bolt is positioned may be formed between the rotating member and the fixing member.

A head supporting portion supporting the head portion of the bolt through the fixing member may be formed at an edge side of the rotating member.

The rotating member may form a protrusion that protrudes upward from the inside of an edge of the head supporting portion.

The first gripper may include a disk-shaped rotating frame in which a through hole through which the push rod passes is formed at a predetermined interval at an edge portion thereof and that is connected to the rotating body, cylindrical push guides having push holes connected to the through hole and spaced apart from a lower edge of the rotating frame, a socket member coupled to a lower end of the push guide, and a magnet member having a connecting hole connected to the push hole and installed inside the socket member.

The first gripper may further include a gripper housing that supports an edge surface of the rotating frame through an inner surface of which an upper end is opened, that is installed on the rotating frame so as to be movable upward and downward, and in which guide holes through which the socket member pass are formed on a bottom surface thereof, a plurality of stoppers protruding from an edge surface of the rotating frame to be coupled to the gripper housing and limiting a vertical movement range of the gripper housing, a spring guide fixed to a central portion of a lower surface of the rotating frame and being couplable to a shaft hole formed in a bottom surface of the gripper housing, and a spring installed in the spring guide and supporting a bottom surface of the rotating frame and a bottom surface of the gripper housing in the gripper housing.

In the gripper housing, a long hole-shaped slot into which the stopper is fitted may be formed long in a vertical direction.

The socket member may be coupled to the head portion of the bolt.

The magnet member may magnetically fix the head portion of the bolt inside the socket member.

The push rod may push the head of the bolt through the through hole, the push hole, and the connecting hole.

The second gripper may include fixing portions fixed to both sides of the mounting bracket to face each other, and a supporting portion that is integrally connected to the fixing portions and supports the fastening target part.

An embodiment of the present disclosure provides a part assembling method that assembles a fastening target part to a correlated part with a bolt by using the part assembly system described above, including: (a) conveying fastening target parts of different models along a set path through a first conveyor and conveying correlated parts of different models along a set path through a second conveyor; (b) recognizing a model of the correlated part and supplying bolts corresponding to the model of the correlated part to a bolt index through a part feeder and a line feeder; (c) picking up bolts aligned in the bolt index through a first gripper, moving the first gripper to a fastening target part on the first conveyor corresponding to a model of a correlated part through a handling robot, and distributing the bolts through the gripper to a fastening portion of the fastening target part; (d) gripping the fastening target part to which the bolts are distributed through a second gripper, and mounting the fastening target part to a mounting jig through the handling robot; and (e) temporarily fastening the fastening target part mounted on the mounting jig to a correlated part through bolts.

In the process (c), the first gripper may grip the bolts aligned in the bolt index through a magnet member along a circular track.

In the process (c), the first gripper may selectively push the bolts according to a forward operation of a push rod by a push cylinder.

In the process (d), the second gripper may support a lower portion of the fastening target part to which the bolts are distributed by the first gripper on the first conveyor, and may load the fastening target part on the mounting jig through the handling robot.

In the process (c), a sensor provided in the mounting jig may determine whether the mounting jig is empty.

In the process (a), a cylinder block may be provided as a correlated part and a head cover to be fastened to the cylinder block may be provided as a fastening target part.

In the process (e), after the temporarily fastening of the head cover to the cylinder block, other parts may be manually assembled to the cylinder block.

According to the embodiments of the present disclosure, it is possible to minimize part assembly errors by cooperative work of a robot, to omit a foolproof process, and to shorten a cycle time according to assembly of parts by cooperative work of a worker and a robot.

Further, effects that may be obtained or expected from embodiments of the present disclosure are directly or suggestively described in the following detailed description. That is, various effects expected from embodiments of the present disclosure will be described in the following detailed description.

BRIEF DESCRIPTION OF THE DRAWINGS

The drawings illustrate embodiments of the present disclosure and are not to be construed to limit any aspect of the invention.

DETAILED DESCRIPTION OF THE EMBODIMENTS

Figure 1:
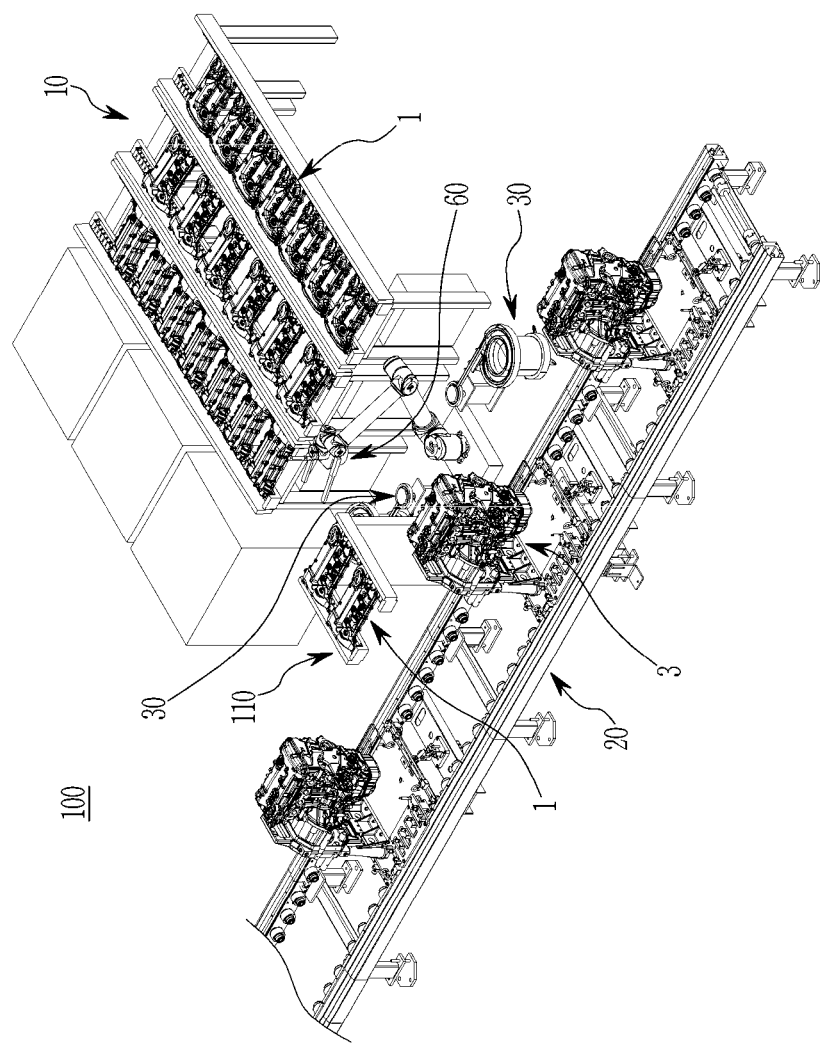
FIG. 1 illustrates a perspective view of a part assembly system according to an embodiment.

The present disclosure will be described more fully hereinafter with reference to the accompanying drawings, in which various embodiments are shown. As those skilled in the art would realize, the described embodiments may be modified in various different ways, all without departing from the spirit or scope of the present disclosure.

Parts that are irrelevant to the description will be omitted to clearly describe the present disclosure, and like reference numerals designate like elements throughout the specification.

Since the size and thickness of each configuration shown in the drawings are arbitrarily shown for convenience of description, the present disclosure is not necessarily limited to configurations illustrated in the drawings, and in order to clearly illustrate several parts and areas, enlarged thicknesses are shown.

Further, in the following detailed description, terms of elements, which are in the same relationship, are divided into "first", "second", etc., but the present disclosure is not necessarily limited to the order in the following description.

In the present specification, unless explicitly described to the contrary, the word "comprise" and variations such as "comprises" or "comprising" will be understood to imply the inclusion of stated elements but not the exclusion of any other elements.

Furthermore, terms such as " . . . unit", " . . . means", " . . . part", and " . . . member" described in the specification mean a unit of a comprehensive configuration having at least one function or operation.

Figure 2:
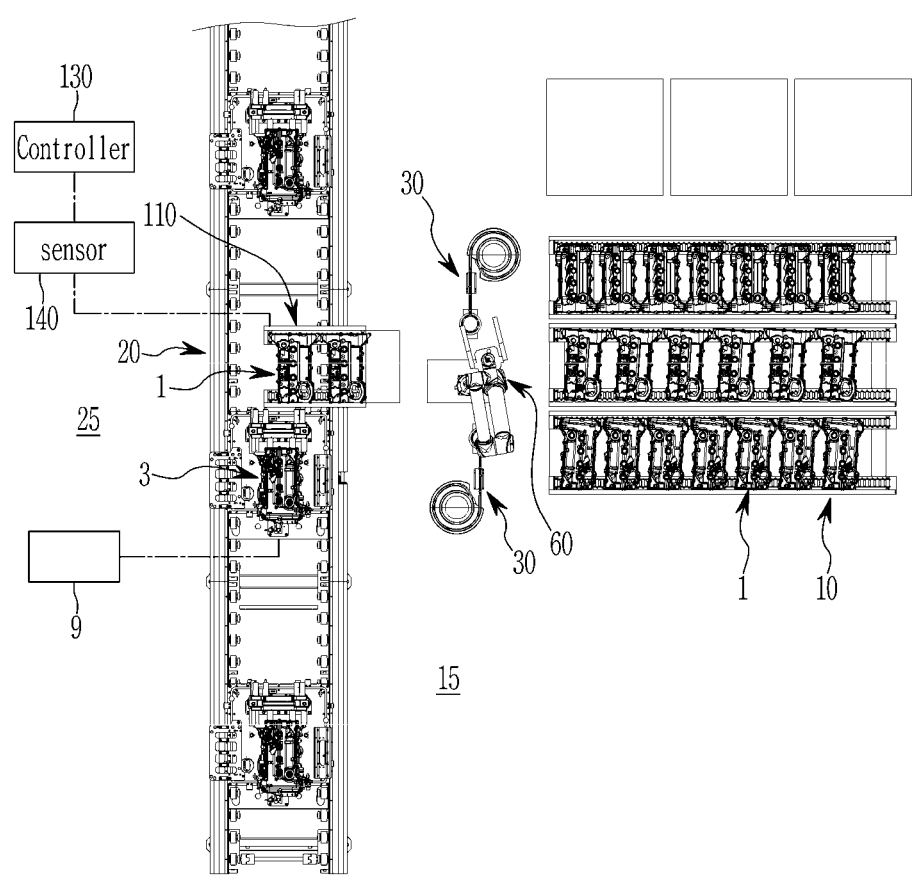
FIG. 2 illustrates a top plan view of a part assembling system according to an embodiment.

FIG. 1 illustrates a perspective view of a part assembling system according to an embodiment of the present disclosure, and FIG. 2 illustrates a top plan view of a part assembling system according to an embodiment of the present disclosure.

Referring to FIG. 1 and FIG. 2, a part assembling system 100 according to an embodiment of the present disclosure may be applied to a process of assembling chassis design parts such as an engine, a transmission, and a suspension in a vehicle production plant.

For example, the part assembling system 100 according to the embodiment of the present disclosure may be applied to a process of fastening a fastening target part included in the chassis design parts to a correlated part through a fastening member such as a bolt in the assembly process as described above.

Figure 3:
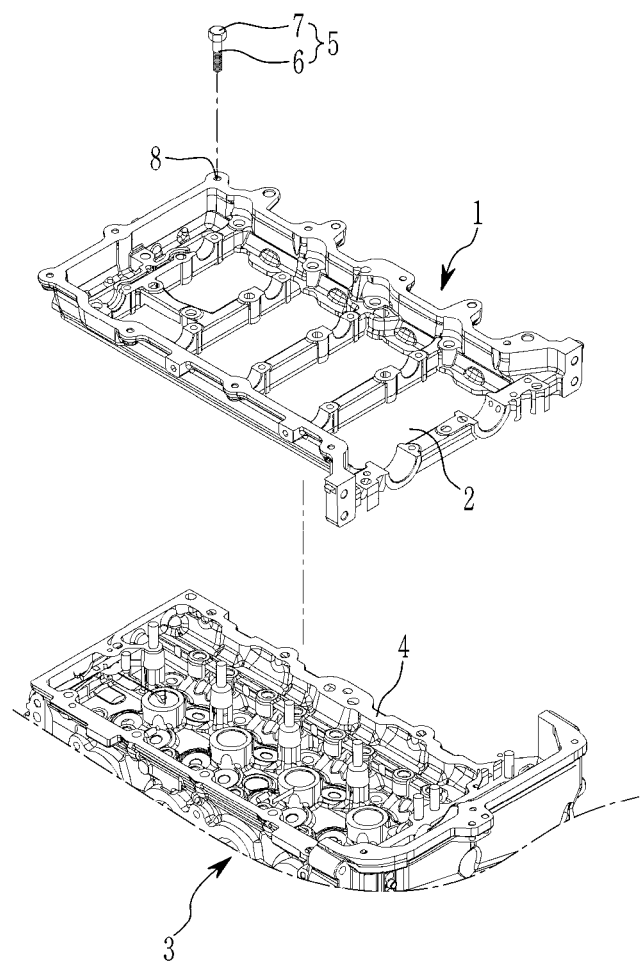
FIG. 3 illustrates a schematic view of an assembly part applied to a part assembling system according to an embodiment.

Furthermore, the part assembling system 100 according to the embodiment of the present disclosure, as shown in FIG. 3, may be applied to a process of assembling (fastening) a head cover 2 as a fastening target part 1 to a cylinder block 4 as a correlated part 3 through a fastening member such as bolts 5, in the engine assembling line. In this embodiment, the bolts 5 include a conventional thread portion 6 and a head portion 7.

However, the present disclosure is not limited to assembling the head cover 2 to the cylinder block 4 in the engine assembling line as described above, and the technical spirit of the present disclosure may be applicable to a feature of fastening various structures such as an oil pan or a timing chain cover to a correlated part with a bolt.

Hereinafter, when describing the following constituent elements on the basis of upward/downward directions, a portion facing upwards will be referred to as an upper end portion, an upper portion, an upper end, and an upper surface, and a portion facing downwards will be referred to as a lower end portion, a lower portion, a lower end, and a lower surface.

However, the definition of the directions mentioned above has a relative meaning and the directions may be varied according to an engagement position of a part and the like, and thus the foregoing reference direction is not limited to a reference direction of the present embodiment.

In addition, hereinafter, an "end (one end or the other end)" may be defined as any one end or may be defined as a predetermined portion (one end portion or the other end portion) including the end.

The part assembling system 100 according to the embodiment of the present disclosure has a structure capable of reducing a cycle time according to assembly of parts by cooperative work of a worker and a robot.

To this end, the part assembling system 100 according to the embodiment of the present disclosure includes a first conveyor 10, a second conveyor 20, a bolt supplying unit 30, and a robot gripper 60.

The constituent elements described above may be configured in one frame or in a frame partitioned into two or more or mutually coupled, in an engine assembly line.

In the embodiment of the present disclosure, the first conveyor 10 conveys the head cover 2 as the fastening target part 1 along a set path, and may convey the fastening target parts 1 of different models along the set path.

For example, the first conveyor 10 may convey the fastening target parts 1 of any one model along a first path, and convey the fastening target parts 1 of the other model along second, third, and more paths.

The drawings illustrate that the fastening target parts 1 of three models are conveyed along the first, second, and third paths, but the present disclosure is not limited thereto, and the fastening target parts 1 of three or more models may be conveyed along another path.

The first conveyor 10 may be provided as a roller type of conveyor having a conventional structure in which conveyor rollers are installed along the conveying path of the fastening target parts 1 on a conveyor frame.

In the embodiment of the present disclosure, the second conveyor 20 conveys the cylinder block 4 as the correlated part 3 to which the fastening target part 1 is fastened along a set path, and may convey the correlated parts 3 of different models along the set path.

For example, the second conveyor 20 may convey the correlated parts 3 of different models along a single path. Here, the second conveyor 20 forms a conveying path of the correlated part along a direction perpendicular to a conveying path of the fastening target part of the first conveyor 10.

The second conveyor 20 may be provided as a roller type of conveyor having a conventional structure in which conveyor rollers are installed along the conveying path of the correlated parts 3 on a conveyor frame.

In the embodiment of the present disclosure, a section between the first and second conveyors 10 and 20 may be set as a robot working section 15, and the second conveyor 20 may be set as a manual working section 25.

In the embodiment of the present disclosure, the bolt supplying unit 30 is for supplying the bolt 5 (see FIG. 3) to a set position and to align the bolt in a set position at that position. The bolt supplying unit 30 is provided in the robot working section 15 between the first and second conveyors 10 and 20.

Here, the bolt supplying unit 30 may arrange bolts 5 corresponding to a model of the fastening target part 1 and the correlated part 3 to be fastened to each other in a set position while supplying the bolts 5 along respective set paths in the robot working section 15.

In the embodiment of the present disclosure, the robot gripper 60 operates as follows through an operation of the robot, and it is provided in the bolt supplying unit 30 in the robot working section 15.

The robot gripper 60 may pick up the bolts 5 corresponding to the model of the fastening target part 1 and the correlated part 3 to be fastened to each other to distribute them to a fastening portion (fastening hole 8 in FIG. 3) of the fastening target part 1, and it may move the fastening target part 1 to the manual working section 25 on the second conveyor 20.

In the manual working section 25, manual work of temporarily fastening the fastening target part 1 that is moved to the set position by the robot gripper 60 to the correlated part 3 through the bolts 5 is performed.

Hereinafter, detailed configurations of the bolt supplying unit 30 and the robot gripper 60 as described above will be described with reference to the accompanying drawings.

Figure 4:
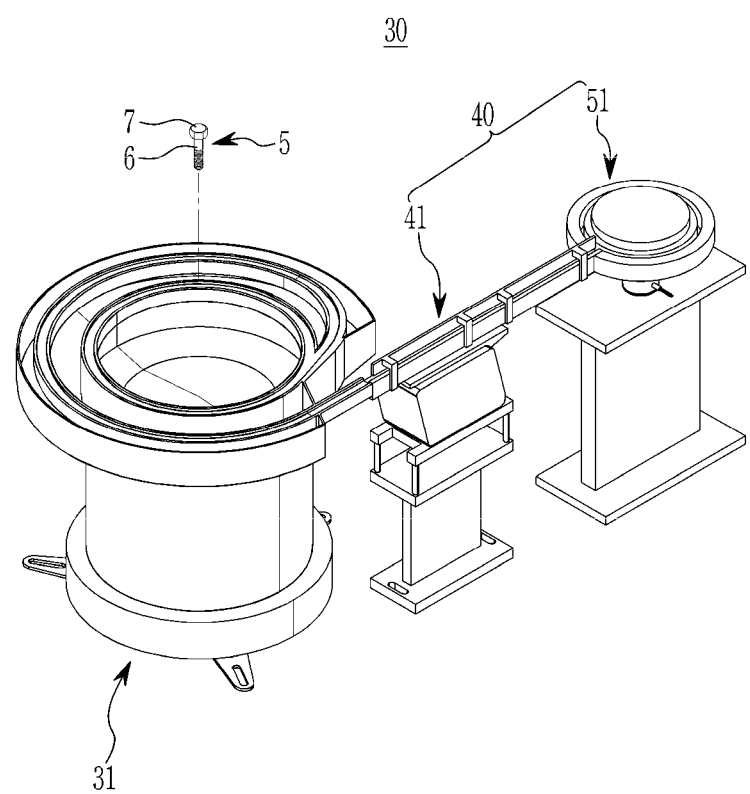
FIG. 4 illustrates a schematic view of a bolt supplying unit applied to a part assembling system according to an embodiment.

FIG. 4 illustrates a schematic view of a bolt supplying unit applied to a part assembly system according to an embodiment of the present disclosure.

Referring to FIG. 4, the bolt supplying unit 30 according to an embodiment of the present disclosure includes a plurality of part feeders 31, and a line feeder 41 and a bolt index 51 included in a bolt aligning portion 40.

In the embodiment of the present disclosure, a pair of part feeders 31 are provided in the robot working section 15 to correspond to several models of the fastening target part 1 and the correlated part 3 to be fastened to each other.

The part feeder 31 may supply the bolts 5 corresponding to the model of the fastening target part 1 and the correlated part 3 to be fastened to each other along a set path.

While randomly supplied bolts are being moved along a set guide line by vibrating force, the part feeder 31 may align the bolts 5 in a set position, for example, a position in which a head portion 7 stands upward.

Since the part feeder 31 is provided as a bolt feeder of a known technique that is well known in the art, a description of its specific configuration will be omitted herein.

In the embodiment of the present disclosure, the bolt aligning portion 40 aligns the bolts 5 supplied through the part feeder 31 at a set position, and it is connected to the part feeder 31. The bolt aligning portion 40 includes the line feeder 41 and bolt index 51 as mentioned above.

Figure 5:
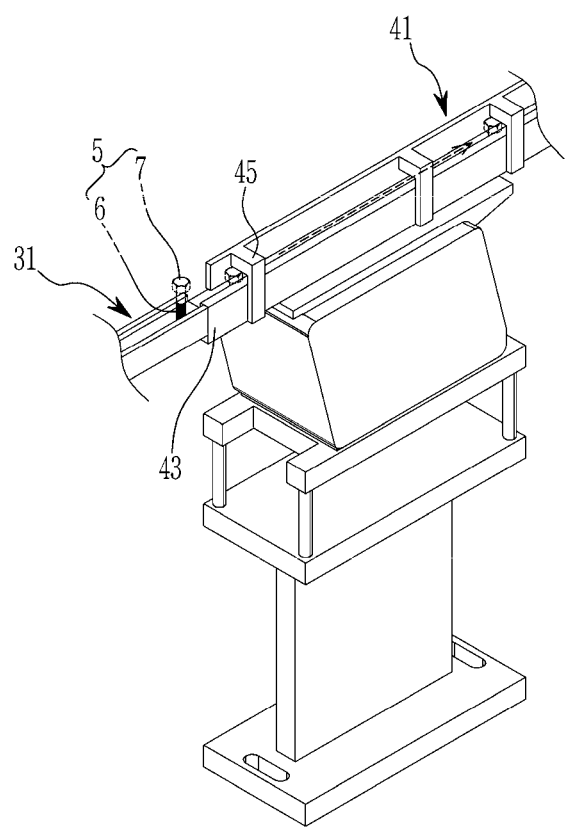
FIG. 5 illustrates a perspective view of a coupling structure of a part feeder and a line feeder applied to a bolt supplying unit of a part assembling system according to an embodiment.

FIG. 5 illustrates a perspective view of a coupling structure of a part feeder and a line feeder applied to a bolt supplying unit of a part assembling system according to an embodiment of the present disclosure.

Referring to FIG. 5, the line feeder 41 according to the embodiment of the present disclosure aligns the bolts 5 supplied through the part feeder 31 for the head portion 7 to be stood upward, and moves the bolts 5 in a straight line direction.

The line feeder 41 is coupled to the part feeder 31. The line feeder 41 includes a rail block 43 for supporting the thread portions 6 of the bolts 5, and a supporting block 45 for supporting the head portions 7 of the bolts 5.

The rail block 43 has a rail groove and is coupled to the part feeder 31. The supporting block 45 is coupled to the rail block 43 and is spaced apart at a predetermined interval along a longitudinal direction of the rail block 43.

Figure 6:
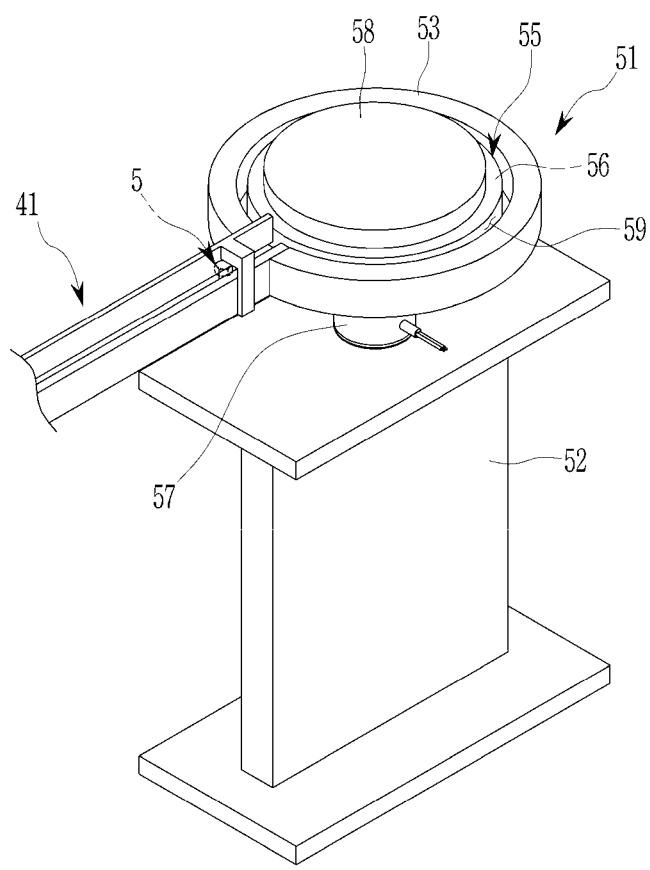
FIG. 6 illustrates a perspective view of a coupling structure of a line feeder and a bolt index applied to a bolt supplying unit of a part assembling system according to an embodiment.
Figure 7:
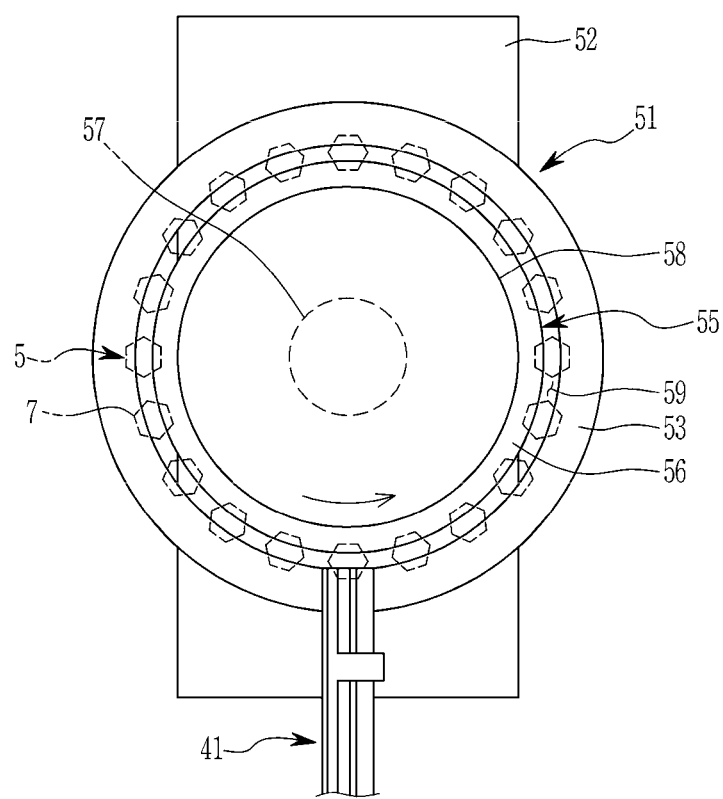
FIG. 7 illustrates a top plan view of a bolt index applied to a bolt supplying unit of a part assembling system according to an embodiment.

FIG. 6 illustrates a perspective view of a coupling structure of a line feeder and a bolt index applied to a bolt supplying unit of a part assembling system according to an embodiment of the present disclosure, and FIG. 7 illustrates a top plan view of a bolt index applied to a bolt supplying unit of a part assembling system according to an embodiment of the present disclosure.

Referring to FIG. 6 and FIG. 7, the bolt index 51 according to the embodiment of the present disclosure aligns the bolts 5 conveyed along the line feeder 41 to be spaced apart at a predetermined interval along a circular track, and is coupled to the line feeder 41.

The bolt index 51 is installed on a supporting frame 52. The bolt index 51 includes a fixing member 53 and a rotating member 55.

The fixing member 53 is connected to the line feeder 41, and is provided with a ring shape having an inner circumferential surface.

The rotating member 55 has a circular block shape and is disposed at a predetermined interval from an inner circumferential side of the fixing member 53, and is rotatably provided by a servo motor 57. The servo motor 57 is fixedly installed on the supporting frame 52 and is connected to the rotating member 55 through a drive shaft.

Here, a space portion 59 in which the thread portion 6 of the bolt 5 (see FIG. 3) is positioned is formed between the rotating member 55 and the fixing member 53. The rotating member 55 is provided with a head supporting portion 56 supporting the head portion 7 of the bolt 5 through the fixing member 53 at an edge side thereof. In addition, the rotating member 55 is provided with a protrusion 58 protruding upward from an inner edge of the head supporting portion 56.

In the embodiment of the present disclosure, when the bolts 5 are conveyed along a straight line direction through the line feeder 41 in a state in which the head portions 7 face upward, the bolt 5 positioned at an end of the line feeder 41 freely falls to the space portion 59 between the fixing member 53 and the rotating member 55 of the bolt index 51.

In this case, the thread portion 6 of the bolt 5 is positioned in the space portion 59, and the head portion 7 of the bolt 5 is supported on upper surfaces of the head supporting portion 56 of the rotating member 55 and the fixing member 53.

In the embodiment of the present disclosure, when the rotating member 55 is rotated through the servo motor 57 at a predetermined rotational speed, the bolts 5 may be aligned to be spaced apart at a predetermined interval along the circular track of the space portion 59.

Figure 8:
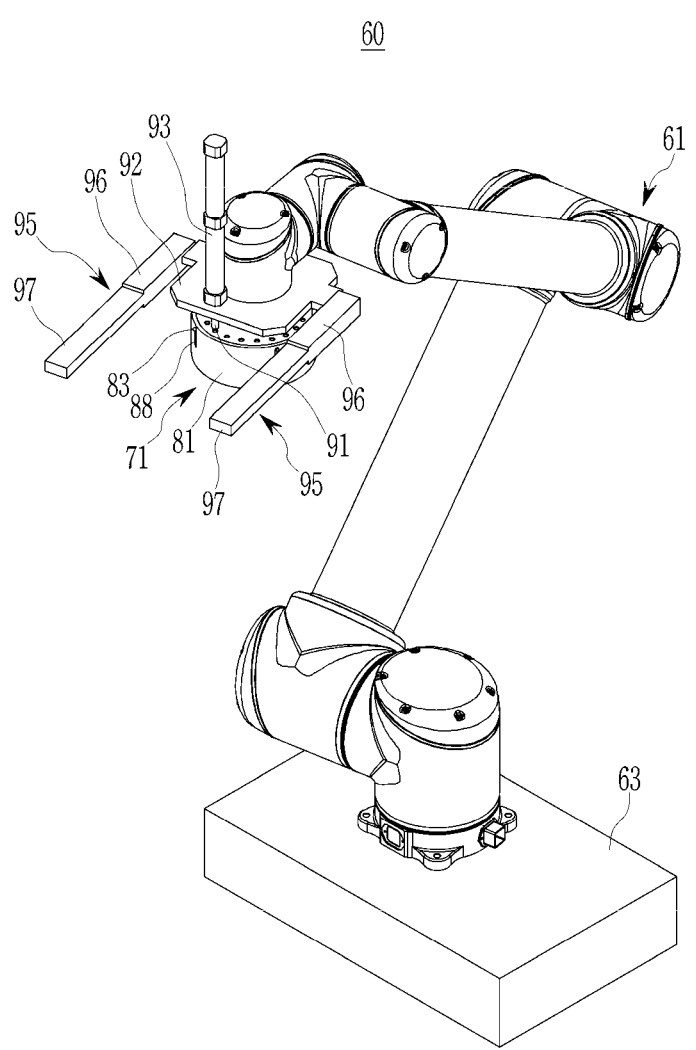
FIG. 8 illustrates a schematic view of a robot gripper applied to a part assembling system according to an embodiment.

FIG. 8 illustrates a schematic view of a robot gripper applied to a part assembling system according to an embodiment of the present disclosure.

Referring to FIG. 8, the robot gripper 60 according to an embodiment of the present disclosure includes a handling robot 61, a first gripper 71, a push rod 91, and a second gripper 95.

In the embodiment of the present disclosure, the handling robot 61 is provided at a bolt supplying unit 30 side in the robot working section 15 described above. The handling robot 61 is installed on a base frame 63 at a floor of a workplace.

The base frame 63 may be fixed to a floor as shown in the drawing, and it may be configured to have a reciprocating slide movement in a set direction along a predetermined rail (not shown in the drawing) on the floor.

The handling robot 61 may operate along a teaching path set within a working radius, and it may be provided as a known multi-joint robot operating at a set torque by a robot controller (not shown).

Figure 9:
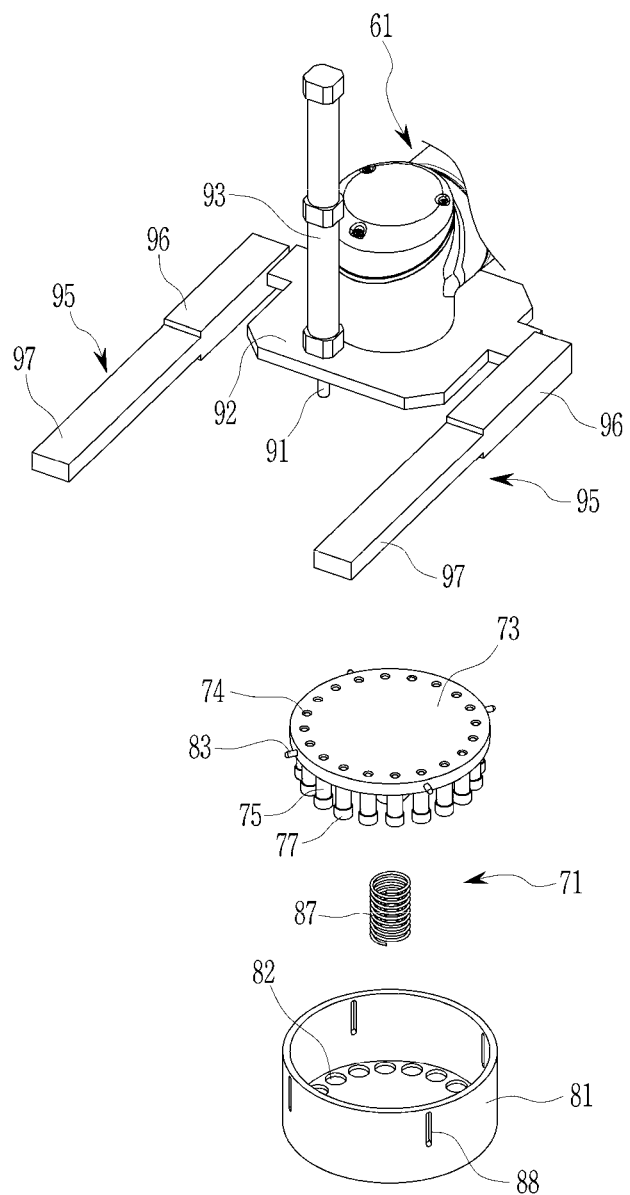
FIG. 9 and FIG. 10 illustrate exploded perspective views of first and second grippers applied to a robot gripper of a part assembling system according to an embodiment.
Figure 10:
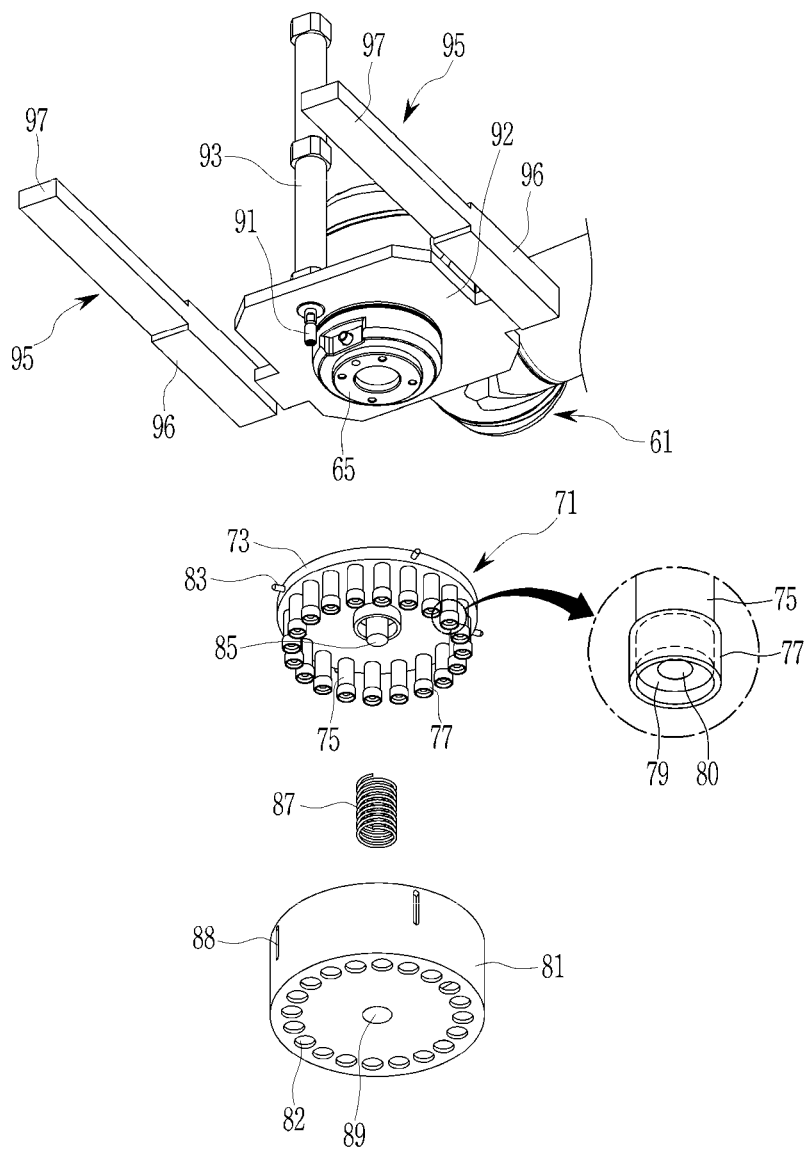
Figure 11:
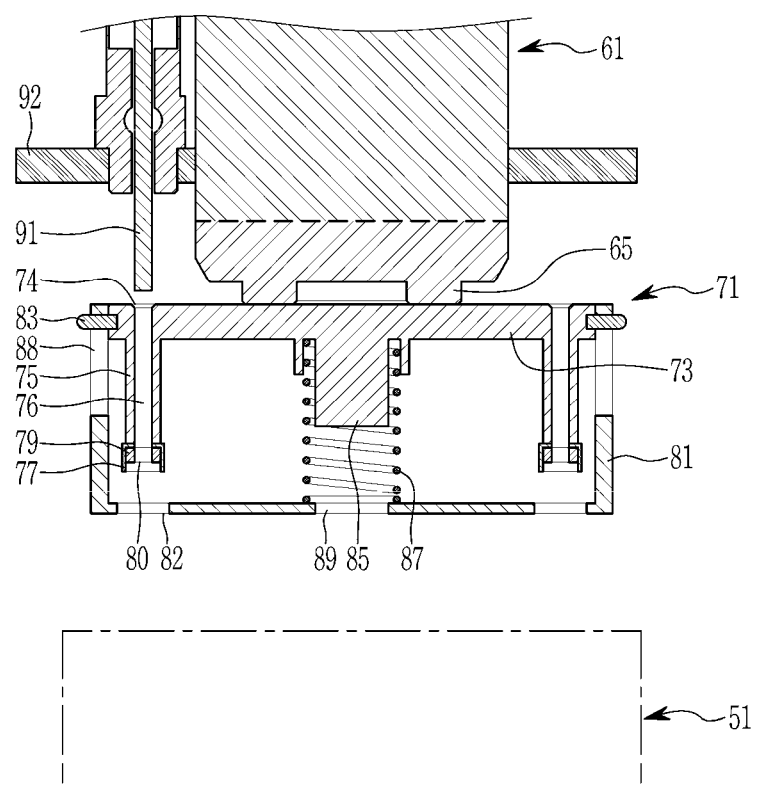
FIG. 11 illustrates an assembled cross-sectional view of a first gripper applied to a robot gripper of a part assembling system according to an embodiment.

FIG. 9 and FIG. 10 illustrate exploded perspective views of first and second grippers applied to a robot gripper of a part assembling system according to an embodiment of the present disclosure, and FIG. 11 illustrates an assembled cross-sectional view of a first gripper applied to a robot gripper of a part assembling system according to an embodiment of the present disclosure.

Referring to FIG. 8 to FIG. 11, the first gripper 71 according to the embodiment of the present disclosure grips the bolts 5 aligned at the bolt index 51 of the bolt aligning portion 40, and distributes the bolts 5 to the fastening portion of the fastening target part 1 on the first conveyor 10.

The first gripper 71 is installed on a rotating body 65 rotatably provided at a front end of the multi-joint arm of the handling robot 61.

Here, the rotating body 65 is rotatably provided in both directions by a motor (not shown in the drawings) at the front end of the arm of the handling robot 61. A rotational speed and a rotational direction of the motor may be controlled by a robot controller.

The first gripper 71 includes a rotating frame 73, a push guide 75, a socket member 77, a magnet member 79, a gripper housing 81, a stopper 83, a spring guide 85, and a spring 87.

The rotating frame 73 has a disc shape, and is coupled to the rotating body 65 of the front end of the arm of the handling robot 61 through a fastening member. The fastening member may comprise any fastening member known in the art.

The rotating frame 73 may be rotated in a set direction by the rotating body 65. The rotating frame 73 is provided with a plurality of through holes 74 at intervals set at an edge portion thereof.

A plurality of push guides 75 correspond to the through holes 74, and are spaced apart from each other at predetermined intervals at a lower edge portion of the rotating frame 73. The push guides 75 are provided with cylindrical shapes having push holes 76 connected to the through holes 74.

The socket member 77 has a cylindrical shape in which upper and lower ends thereof are open, and is coupled to lower ends of the push guides 75. The socket member 77 is coupled to the head portion 7 of the bolt 5, and accommodates the head portion 7 therein.

The magnet member 79 fixes the head portion 7 of the bolt 5 by magnetic force inside the socket member 77, and is installed inside the socket member 77. The magnet member 79 is provided with a connecting hole 80 connected to the push holes 76 of the push guides 75.

The gripper housing 81 is a housing in which an upper end thereof is opened and a lower end thereof is closed, and is installed to be movable in a vertical direction on the rotating frame 73.

The gripper housing 81 supports an edge surface of the rotating frame 73 through an inner surface of which an upper end is open. In addition, the gripper housing 81 is provided with guide holes 82 through which the socket member 77 described above penetrates at a bottom edge portion.

That is, when the rotating frame 73 is fixed by the handling robot 61, the gripper housing 81 may support an edge surface of the rotating frame 73 and move upward and downward.

In addition, when the gripper housing 81 is fixed, the rotating frame 73 may be moved up and down along an inner surface of the gripper housing 81 by the handling robot 61.

The stopper 83 is coupled to the gripper housing 81 to limit a vertical movement range of the gripper housing 81, and a plurality of stoppers 83 protrude from an edge surface of the rotating frame 73. For example, the stoppers 83 are disposed at intervals of 90 degrees on the edge surface of the rotating frame 73.

Here, an upper end portion of the gripper housing 81 corresponding to the edge surface of the rotating frame 73 is provided with a long hole-shaped slot 88 to which the stopper 83 may be fitted and coupled.

The spring guide 85 is fixed to a central portion of a lower surface of the rotating frame 73, and it is provided to be able to be coupled to a shaft hole 89 provided on a bottom surface of the gripper housing 81.

The spring 87 is installed on the spring guide 85 inside the gripper housing 81 and is provided as a compression coil spring. The spring 87 supports a lower surface of the rotating frame 73 and a bottom surface of the gripper housing 81 inside the gripper housing 81.

In the embodiment of the present disclosure, the push rod 91 selectively pushes the bolts 5 gripped by the first gripper 71 as described above, and mounts the bolts 5 on the fastening portion of the fastening target part 1.

The push rod 91 passes through the through hole 74 of the rotating frame 73, the push hole 76 of the push guide 75 and pushes the head portion 7 of the bolt 5 that is attached to the magnet member 79 inside the socket member 77.

The push rod 91 is installed to a mounting bracket 92 fixed to the front end of the arm of the handling robot 61. The mounting bracket 92 is installed to be fixed to the front end of the arm of the handling robot 61, separately from the rotating body 65.

The push rod 91 is connected to an operating rod of a push cylinder 93 fixed to the mounting bracket 92. The push rod 91 penetrates through the mounting bracket 92, and may be moved upward and downward by forward and backward operations of the push cylinder 93 between a lower surface of the mounting bracket 92 and an upper surface of the rotating frame 73.

In the embodiment of the present disclosure, the second gripper 95 grips the fastening target part 1 on the first conveyor 10 to which the bolts 5 are distributed by the first gripper 71, and moves the fastening target part 1 to a set position through the handling robot 61.

The second gripper 95 is installed in the mounting bracket 92 mentioned above. The second gripper 95 includes fixing portions 96 fixed to both sides of the mounting bracket 92, and supporting portions 97 integrally connected to the fixing portions 96.

The fixing portions 96 are fixed to both sides of the mounting bracket 92 through a fastening member of the known art, and they face each other. The supporting portion 97 has a function of supporting the fastening target part 1 from a lower side thereof.

Meanwhile, the part assembling system 100 according to the embodiment of the present disclosure further includes a mounting jig 110 (see FIG. 1 and FIG. 2) for mounting the fastening target part 1, which is conveyed through the handling robot 61 in a state of being gripped by the second gripper 95.

In the embodiment of the present disclosure, the mounting jig 110 is installed in the manual working section 25 of the second conveyor 20 side.

The mounting jig 110 aligns and mounts the fastening target part 1 to which the bolts 5 are distributed, and for example, the mounting jig 110 may be provided to have a conveyor type in which supporting rollers are provided in a frame.

Furthermore, the embodiment of the present disclosure includes a controller 130 for controlling an overall operation of the part assembling system 100 as shown in FIG. 2.

The controller 130 may be implemented as at least one control processor operating by a predetermined program, and in order to perform the contents according to the embodiment of the present disclosure, it may include a series of instructions.

Here, the controller 130 recognizes a model of the correlated part 3 conveyed on the second conveyor 20, and for example, the controller 130 may recognize the model of the correlated part 3 by detecting a barcode and like of a known technology provided in the correlated part 3.

In addition, the controller 130 determines whether the mounting jig 110 mentioned above is empty, and for example, the controller 130 may determine whether the fastening target part 1 is fastened to the mounting jig 110 through a sensor 140 of a known technology provided in the mounting jig 110 and whether the mounting jig 110 is empty.

Hereinafter, an operation of the part assembling system 100 according to the embodiment of the present disclosure configured as described above and the part assembling method using the part assembling system 100 will be described in detail with reference to the accompanying drawings.

Figure 12:
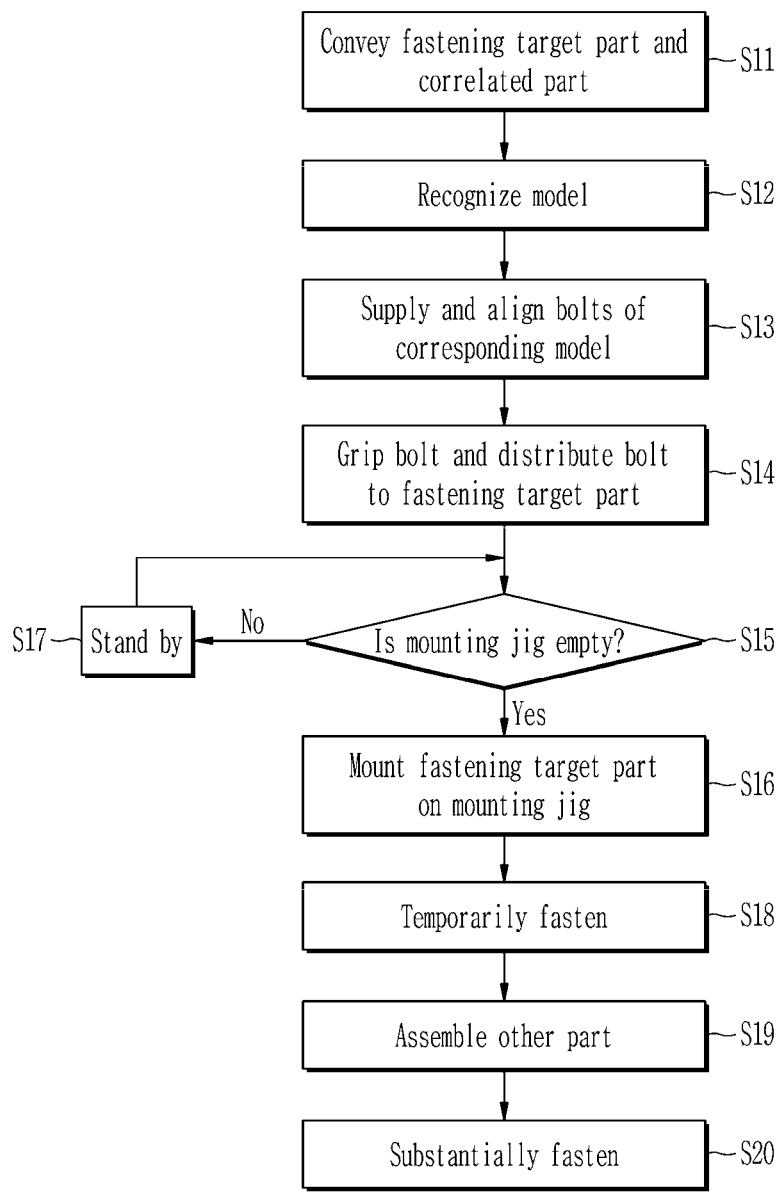
FIG. 12 illustrates a flowchart of a part assembling method using a part assembling system according to an embodiment.

FIG. 12 illustrates a flowchart of a part assembling method using a part assembling system according to an embodiment of the present disclosure.

Referring to FIG. 12 and the above-described drawings, in the embodiment of the present disclosure, the fastening target parts 1 of different models are respectively conveyed along the set paths of the first conveyor 10 in the engine assembling line.

At the same time, in the embodiment of the present disclosure, the correlated parts 3 of different models to which the fastening target part 1 are conveyed along the set path of the second conveyor 20 (S11).

In this process, in the embodiment of the present disclosure, the controller 130 detects a barcode or the like provided on the correlated part 3 on the second conveyor 20 to recognize the model of the correlated part 3 (S12).

Next, in the embodiment of the present disclosure, the bolts 5 corresponding to the model of the correlated part 3 are supplied to the set position and aligned (S13).

In this process, the part feeder 31 in which the bolts 5 are accommodated is driven, and then the part feeder 31 aligns the bolts 5 in an upright position with the head portion 7 facing upward, and moves the bolts 5 to the line feeder 41.

Then, the line feeder 41 aligns the bolts 5 supplied through the part feeder 31 upright so that the head portion 7 faces upward, and moves the bolts 5 to the bolt index 51 along the straight line direction.

In this case, the line feeder 41 supports the thread portion 6 of the bolt 5 through the rail block 43, supports the head portion 7 of the bolt 5 through the supporting block 45, and moves the bolts to the bolt index 51 while aligning the bolts 5 in line.

As described above, when the bolts 5 are conveyed along a straight line direction through the line feeder 41 in a state in which the head portions 7 face upward, in the embodiment of the present disclosure, the bolt 5 positioned at an end of the line feeder 41 freely falls to the space portion 59 between the fixing member 53 and the rotating member 55 of the bolt index 51.

Therefore, the thread portion 6 of the bolt 5 is positioned in the space portion 59, and the head portion 7 of the bolt 5 is placed on the upper surfaces of the head supporting portion 56 of the rotating member 55 and the fixing member 53.

At the same time, in the embodiment of the present disclosure, the rotating member 55 is rotated through the servo motor 57 at a set rotational speed. Then, in the embodiment of the present disclosure, the bolts 5 may be aligned at predetermined intervals along the circular track at the bolt index 51.

On the other hand, in the embodiment of the present disclosure, the first gripper 71 is positioned at an upper side of the bolt index 51 as described above by the handling robot 61.

Here, the gripper housing 81 of the first gripper 71 is supported on the stopper 83 of the rotating frame 73 by the elastic force of the spring 87, and the socket member 77 is positioned inside the gripper housing 81 through the push guide 75.

Furthermore, the push rod 91 is in a reversed state between the lower surface of the mounting bracket 92 and the upper surface of the rotating frame 73 by an reverse operation of the push cylinder 93, and is spaced apart from the through hole 74 of the rotating frame 73.

Figure 13:
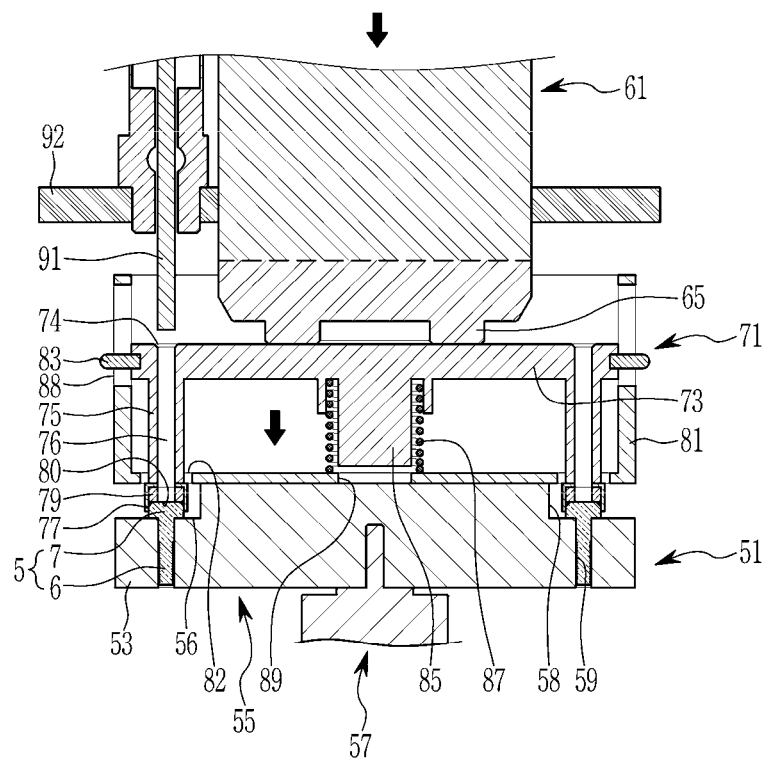
FIG. 13 to FIG. 15 illustrate schematic views of an operating state of a first gripper for explaining a part assembling method using a part assembling system according to an embodiment.

In this state, in the embodiment of the present disclosure, the first gripper 71 is moved to an upper surface side of the bolt index 51 by the handling robot 61 as shown in FIG. 13.

Then, in the embodiment of the present disclosure, in a state in which the bottom surface of the gripper housing 81 of the first gripper 71 is in close contact with the protrusion 58 of the rotating member 55 at the bolt index 51 by the handling robot 61, the rotating frame 73 is pressed by the handling robot 61.

Accordingly, the rotating frame 73 overcomes the elastic force of the spring 87 and moves downward along the inner surface of the gripper housing 81, and in this case, it moves downward while being supported by the stopper 83 through the slot 88 of the gripper housing 81.

Then, the socket member 77 coupled to the push guides 75 of the rotating frame 73 protrudes downward through the guide hole 82 of the bottom surface of the gripper housing 81. In this case, the socket member 77 is placed over the upper surfaces of the head supporting portion 56 and the fixing member 53 and protrudes toward the head portion 7 side of the aligned bolts 5.

Accordingly, in the embodiment of the present disclosure, the head portions 7 are fixed through the magnet member 79 inside the socket member 77 while coupling the head portions 7 of the bolts 5 to the inside of the socket member 77.

Figure 14:
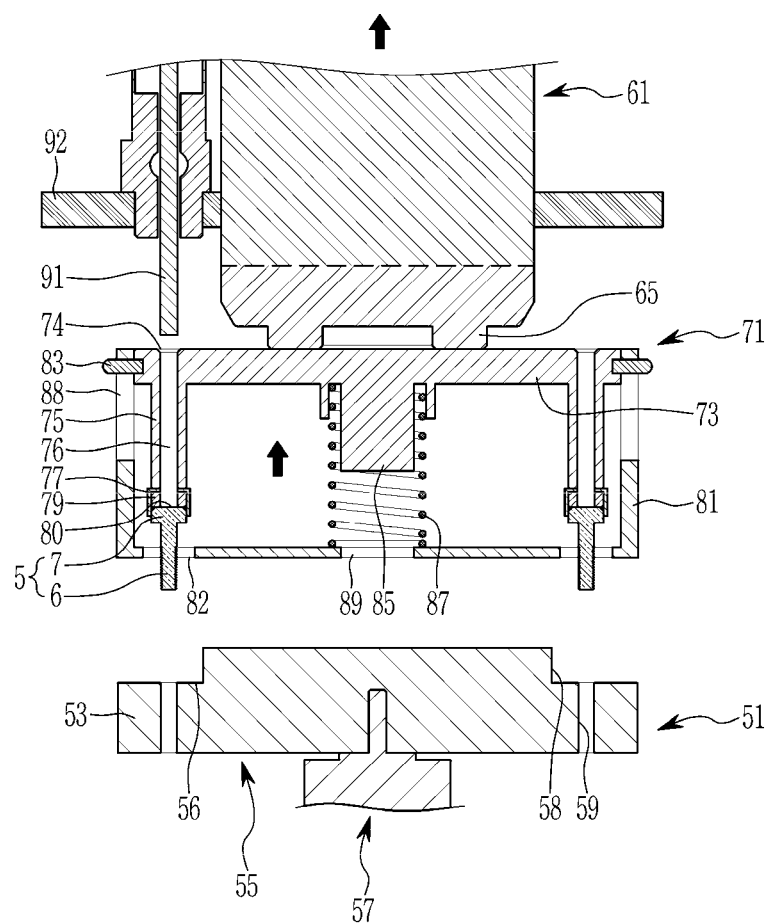

Next, in the embodiment of the present disclosure, when the first gripper 71 is moved upward through the handling robot 61, as shown in FIG. 14, the rotating frame 73 is also moved upward.

In this process, the gripper housing 81 is moved to its original position by the elastic restoring force of the spring 87, and is maintained in a state supported on the stopper 83 through the slot 88.

Accordingly, the socket member 77 is positioned inside the gripper housing 81 through the guide hole 82, and the thread portions 6 of the bolts 5 are maintained in a state of protruding downward from the bottom surface of the gripper housing 81.

Figure 15:
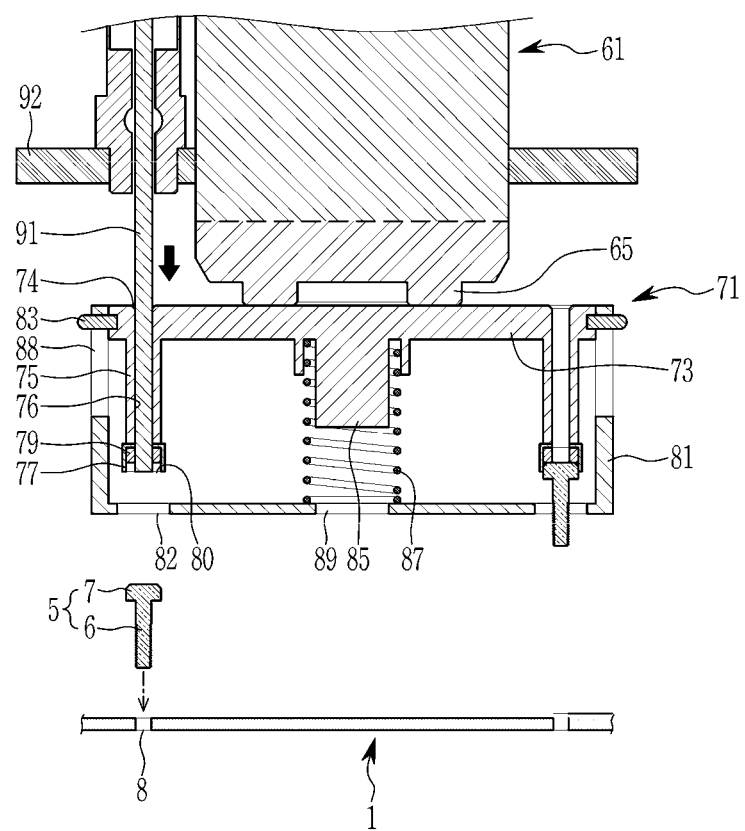

In this state, in the embodiment of the present disclosure, as shown in FIG. 15, the first gripper 71 is moved to the fastening target part 1 side on the first conveyor 10 through the handling robot 61. In this case, the first gripper 71 is moved to the fastening target part 1 side of the model corresponding to the set model of the correlated part 3.

Then, in the embodiment of the present disclosure, the thread portions 6 of the bolts 5 gripped by the first gripper 71 are positioned at the side of the fastening portion (fastening hole) side of the fastening target part 1. Here, the push rod 91 is positioned at the fastening portion side of the fastening target part 1 on which the bolt 5 is to be mounted.

Subsequently, in the embodiment of the present disclosure, the push rod 91 is moved downward by the forward operation of the push cylinder 93. Then, the push rod 91 pushes the head portion 7 of the bolt 5 through the through hole 74 of the rotating frame 73, the push hole 76 of the push guide 75, and the connecting hole 80 of the magnet member 79.

Then, in the embodiment of the present disclosure, by pushing the bolt 5 through the push rod 91, the head portion 7 of the bolt 5 is separated from the magnet member 79, and the bolt 5 is mounted on the fastening portion of the fastening target part 1.

Next, in the embodiment of the present disclosure, the rotating frame 73 of the first gripper 71 is rotated through the rotating body 65, and in a state in which the thread portion 6 of the bolt 5 is positioned on another fastening portion side of the fastening target part 1, through the process described above, the bolt 5 is mounted on another fastening portion (S14).

Subsequently, in a state in which the bolts 5 are mounted on the fastening portions of the fastening target parts 1 through the first gripper 71 as described above, in the embodiment of the present disclosure, the second gripper 95 is moved together with the first gripper 71 through the handling robot 61, and the fastening target part 1 is supported from the lower side thereof through the supporting portion 97 of the second gripper 95.

In this process, the controller 130 determines whether the mounting jig 110 is empty through the sensor 140 provided in the mounting jig 110 of the second conveyor 20 (S15). In the embodiment of the present disclosure, when it is determined that the mounting jig 110 is empty through the controller 130, the fastening target part 1 gripped by the second gripper 95 is mounted on the mounting jig 110 of the manual working section 25 through the handling robot 61 (S16).

In this case, when it is determined that the mounting jig 110 is not empty through the controller 130, in the embodiment of the present disclosure, a robot standby state in which the fastening target part 1 gripped by the second gripper 95 is not mounted on the mounting jig 110 through the handling robot 61 is maintained (S17).

On the other hand, as described above, in a state in which the fastening target part 1 in which the bolts 5 are mounted on the fastening portion is mounted on the mounting jig 110, in the embodiment of the present disclosure, the fastening target part 1 is manually positioned on the correlated part 3, the bolts 5 are manually bolted, and the fastening target part 1 is temporarily fastened to the correlated part 3 (S18).

Then, in the embodiment of the present disclosure, another part (see FIG. 2), for example, a spark plug, is manually assembled to the correlated part 3 in the manual working section 25 (S19).

Finally, in the embodiment of the present disclosure, the bolts 5 are bolted in a later process, and the fastening target part 1 is substantially fastened to the correlated part 3 (S20).

According to the part assembly system 100 and the part assembling method using the same according to the embodiment of the present disclosure as described above, the fastening target part 1 and the bolts 5 suitable for the model of the correlated part 3 may be automatically selected.

In addition, in the embodiment of the present disclosure, the bolts 5 are supplied and aligned through the bolt supplying unit 30 suitable for the model in the robot working section 15, and while distributing the bolts 5 to the fastening target part 1 through the robot gripper 60, the fastening target part 1 may be conveyed to manual working section 25.

Furthermore, in the embodiment of the present disclosure, the fastening target part 1 may be temporarily fastened to the correlated part 3 through the bolts 5 in the manual working section.

Therefore, according to the embodiments of the present disclosure, it is possible to minimize part assembly errors by cooperative work of a robot, to omit a foolproof process, and to shorten a cycle time according to assembly of parts by cooperative work of a work and a robot.

As a result, according to the embodiments of the present disclosure, it is possible to ensure assembly flexibility of parts of many models, and it is possible to improve productivity and assembly quality of parts through cooperative work of a worker and a robot.

While this disclosure has been described in connection with what is presently considered to be practical embodiments, it is to be understood that the disclosure is not limited to the disclosed embodiments, but, on the contrary, is intended to cover various modifications and equivalent arrangements included within the spirit and scope of the appended claims.

What is claimed is:

1. A part assembly system comprising:
    a first conveyor configured to convey fastening target parts of different models along a set path;
    a second conveyor configured to convey correlated parts of different models to which the fastening target parts are fastened through bolts along a set path;
    a plurality of part feeders provided in a robot working section between the first and second conveyors and supplying bolts corresponding to a model of a fastening target part and a correlated part to be fastened to each other along respective predetermined paths;
    a bolt aligning portion connected to the part feeder and aligning bolts supplied through the part feeder at a predetermined position;
    a handling robot having a rotating body rotatably provided at a front end of a multi joint arm and installed in the robot working section;
    a first gripper installed at the rotating body and configured to grip bolts aligned at the bolt aligning portion to distribute the bolts to a fastening portion of a fastening target part on the first conveyor;
    a second gripper installed on a mounting bracket fixed to a front end portion of an arm of the handling robot and gripping a fastening target part on the first conveyor to which the bolts are distributed; and
    a push rod installed in the mounting bracket to be movable upward or downward through a push cylinder, and selectively pushing the bolts gripped by the first gripper, wherein the first gripper includes:
        a disk-shaped rotating frame in which a through hole through which the push rod passes is formed at a predetermined interval at an edge portion thereof and that is connected to the rotating body,
        cylindrical push guides having push holes connected to the through hole and spaced apart from a lower edge of the rotating frame,
        a socket member coupled to a lower end of the push guide, and
        a magnet member having a connecting hole connected to the push hole and installed inside the socket member,
        a gripper housing that supports an edge surface of the rotating frame through an inner surface of which an upper end is opened, that is installed on the rotating frame so as to be movable upward and downward, and in which guide holes through which the socket member pass are formed on a bottom surface thereof, a plurality of stoppers protruding from an edge surface of the rotating frame to be coupled to the gripper housing and limiting a vertical movement range of the gripper housing, a spring guide fixed to a central portion of a lower surface of the rotating frame and being couplable to a shaft hole formed in a bottom surface of the gripper housing, and a spring installed in the spring guide and supporting a bottom surface of the rotating frame and a bottom surface of the gripper housing in the gripper housing.

2. The part assembly system of claim 1, further comprising a mounting jig installed in a manual working section of the second conveyor to allow the fastening target parts gripped by the second gripper to be mounted by the handling robot.

3. The part assembly system of claim 1, wherein
the bolt aligning portion includes
a line feeder connected to the part feeder and aligning the bolts so that the head portions thereof face upward, and conveying the bolts in a straight line direction, and
a bolt index connected to the line feeder and aligning the bolts to be conveyed at a set interval along a circular track.

4. The part assembly system of claim 3, wherein
the line feeder includes
a rail block supporting a thread portion of the bolt, and
a supporting block supporting a head portion of the bolt.

5. The part assembly system of claim 3, wherein
the bolt index includes
a ring-shaped fixing member connected to the line feeder, and
a circular block-shaped rotating member disposed at a predetermined interval with an inner circumferential side of the fixing member and being rotatable by a servo motor.

6. The part assembly system of claim 5, wherein
a space in which the thread portion of the bolt is positioned is formed between the rotating member and the fixing member, a head supporting portion supporting the head portion of the bolt through the fixing member is formed at an edge side of the rotating member, and the rotating member forms a protrusion that protrudes upward from the inside of an edge of the head supporting portion.

7. The part assembly system of claim 1, wherein,
in the gripper housing,
a long hole-shaped slot into which the stopper is fitted is formed long in a vertical direction.

8. The part assembly system of claim 1, wherein
the socket member is coupled to the head portion of the bolt, and
the magnet member magnetically fixes the head portion of the bolt inside the socket member.

9. The part assembly system of claim 8, wherein
the push rod pushes the head of the bolt through the through hole, the push hole, and the connecting hole.

10. The part assembly system of claim 1, wherein
the second gripper includes fixing portions fixed to both sides of the mounting bracket to face each other, and a supporting portion that is integrally connected to the fixing portions and supports the fastening target part.

* * * * *